(12) United States Patent
Fischer

(10) Patent No.: US 6,660,198 B1
(45) Date of Patent: Dec. 9, 2003

(54) PROCESS FOR MAKING A PLASTIC COUNTERFLOW HEAT EXCHANGER

(75) Inventor: Richard L. Fischer, Lisle, IL (US)

(73) Assignee: Marconi Communications, Inc., Cleveland, OH (US)

( * ) Notice: Subject to any disclaimer, the term of this patent is extended or adjusted under 35 U.S.C. 154(b) by 365 days.

(21) Appl. No.: 09/664,624

(22) Filed: Sep. 19, 2000

(51) Int. Cl.$^7$ .............................................. B29C 39/10
(52) U.S. Cl. ....................... 264/138; 264/238; 264/250; 264/263; 264/275
(58) Field of Search ................................ 264/138, 263, 264/238, 275, 250

(56) References Cited

U.S. PATENT DOCUMENTS

| | | | | |
|---|---|---|---|---|
| 2,313,315 A | * | 3/1943 | Blais | 165/148 |
| 2,337,584 A | * | 12/1943 | Baker | 138/47 |
| 3,435,893 A | * | 4/1969 | Withers | 165/158 |
| 3,579,810 A | * | 5/1971 | Mon | 29/527.1 |
| 3,697,635 A | * | 10/1972 | Dietzsch et al. | 264/135 |
| 3,841,938 A | * | 10/1974 | Grosse-Holling et al. | 156/293 |
| 3,961,010 A | * | 6/1976 | Holmes | 264/221 |
| 4,175,308 A | * | 11/1979 | Togashi | 29/890.054 |
| 4,177,816 A | * | 12/1979 | Torgeson | 128/400 |
| 4,609,039 A | * | 9/1986 | Fushiki et al. | 96/126 |
| 4,858,655 A | | 8/1989 | Palau et al. | |
| 4,858,685 A | | 8/1989 | Szucs et al. | |
| 4,874,035 A | | 10/1989 | Kashiwada et al. | |
| 4,997,031 A | | 3/1991 | Kashiwada et al. | |
| 5,431,292 A | * | 7/1995 | Culter et al. | 215/48 |

FOREIGN PATENT DOCUMENTS

| | | |
|---|---|---|
| GB | 2158569 | 11/1985 |
| WO | WO 83/01998 | 6/1983 |
| WO | WO 99/24772 | 5/1999 |

* cited by examiner

*Primary Examiner*—Edmund H. Lee
(74) *Attorney, Agent, or Firm*—Jones Day

(57) ABSTRACT

A process for making inner and outer ducts for a simple but effective plastic heat exchanger by a simple blow molding or thermoforming technique. Seals are formed by providing initially closed inner ducts which are stacked on one another and the end portions of the inner ducts are placed in a mold. A castable adhesive sealant is placed in the mold and around the stacked inner ducts. After curing, the mold and the stacked inner ducts are separated and a portion of the stack and a portion of the seal material are cut and removed. Thereafter, the outer duct is positioned about the stacked inner ducts so that two different flow paths are formed. Instead of molding the seal, a preformed seal may be press fitted to the stack of inner ducts.

5 Claims, 10 Drawing Sheets

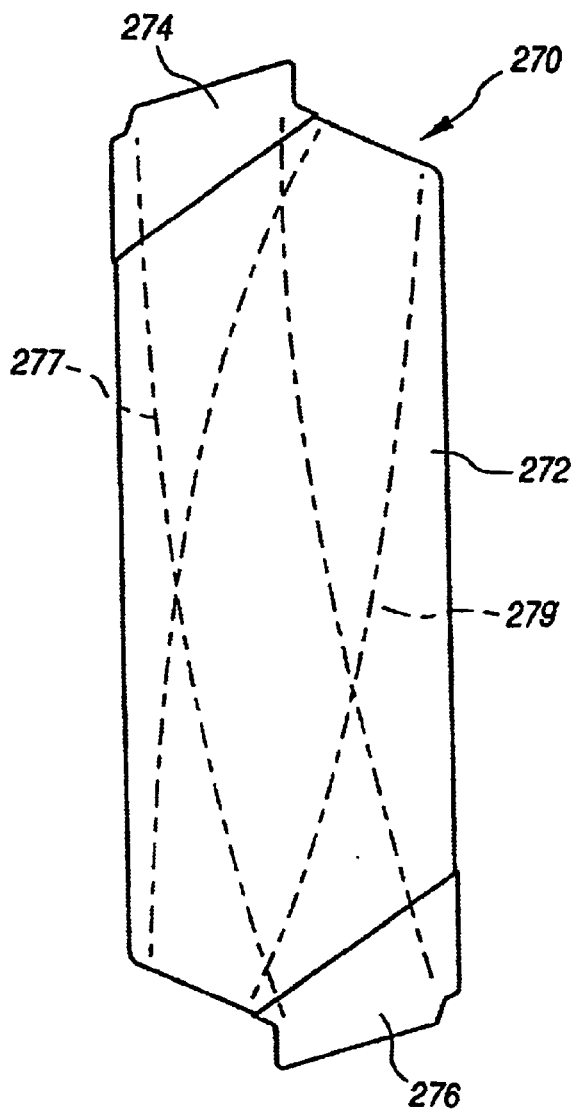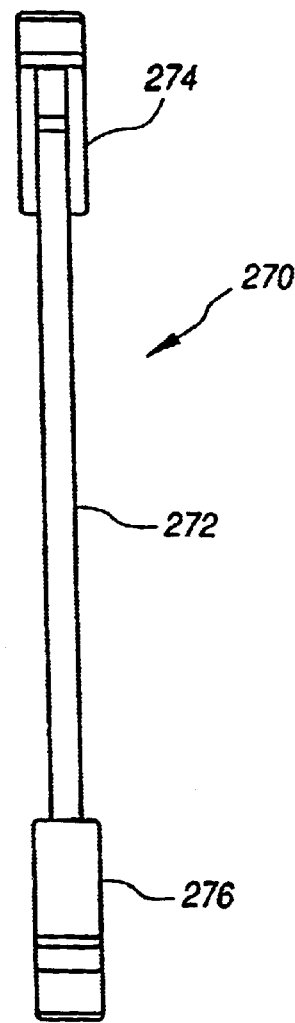
FIG. 20    FIG. 21
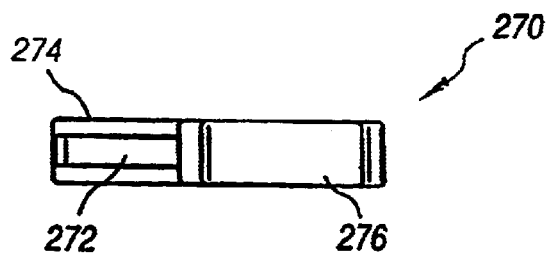
FIG. 22

PROCESS FOR MAKING A PLASTIC COUNTERFLOW HEAT EXCHANGER

BACKGROUND OF THE INVENTION

1. Field of The Invention

The present invention relates to a plastic counterflow heat exchanger and more particularly to a counterflow heat exchanger that is inexpensive to manufacture and yet is efficient and effective.

2. Description Of The Related Art

Inexpensive plastic heat exchangers are very useful because of low manufacturing cost and because such heat exchangers can be custom molded to fit specific spaces, such as those in crowded, free-standing equipment cabinets commonly used to house telecommunications equipment. In such equipment cabinets, the fluid to be cooled is air from a sealed equipment compartment. The cooling fluid, typically, is ambient air. Hence, the fluids being handled are not usually corrosive, nor is high pressure involved.

Most plastic heat exchangers are of the cross flow type as exemplified by U.S. Pat. Nos. 4,997,031 and 4,858,685; and PCT applications SE82/00393 and GB98/03368. Cross flow heat exchangers are typically constructed of rectangular panels or sheets which are stacked together and which have small projections on one of their major surfaces to space one sheet from the next. The cooled fluid enters from one side of the rectangular stack and exits from an opposite side. In a like fashion the cooling fluid enters the stack from a side 90 degrees removed from the flow of the cooled fluid and exits through an opposite side. The fluid flows alternate between sheets, and seals are provided at the corners of the stack to separate the two flows. Such seals are generally adequate in cross flow heat exchangers.

An example of a plastic counterflow heat exchanger is UK patent application No. GB 2,158,569. However, ducting to and from the heat exchanger is not addressed in the application even though it is an important consideration in the design of such units. Further, seals for plastic counterflow heat exchangers are difficult to arrange. Hence, there is still a need for effective, efficient and low cost counterflow heat exchangers.

BRIEF SUMMARY OF THE INVENTION

The present invention resolves some of the problems of the related art by providing a process for forming a plastic counterflow heat exchanger comprising the steps of molding a plurality of inner ducts, each duct having larger end portions and a smaller middle portion, stacking the inner ducts on their end portions whereby spaces exist around the middle portions, forming a seal around each stack of end portions, molding an outer duct, and positioning the outer duct about the stack of inner ducts.

It is an object of the present invention to provide a process for making a plastic counterflow heat exchanger which is simple, reliable and inexpensive. Another aim of the present invention is to provide a plastic counterflow heat exchanger having low tooling costs. Yet another aspect of the present invention is to provide a plastic counterflow heat exchanger process which allows inexpensive custom designs and dimensions for numerous different applications. Still another aspect of the present invention is to provide a plastic counterflow heat exchanger which is very efficient and highly effective.

A more complete understanding of the present invention and other objects, aspects, aims and advantages thereof will be gained from a consideration of the following description of the preferred embodiments read in conjunction with the accompanying drawings provided herein.

BRIEF DESCRIPTION OF THE SEVERAL VIEWS OF THE DRAWINGS

FIG. 20 is a front elevation view of the inner duct shown in FIG. 19.

FIG. 21 is a side elevation view of the inner duct shown in FIGS. 19 and 20.

FIG. 22 is a plan view of the inner duct shown in FIGS. 19–21.

DETAILED DESCRIPTION OF THE INVENTION

Figure 1:
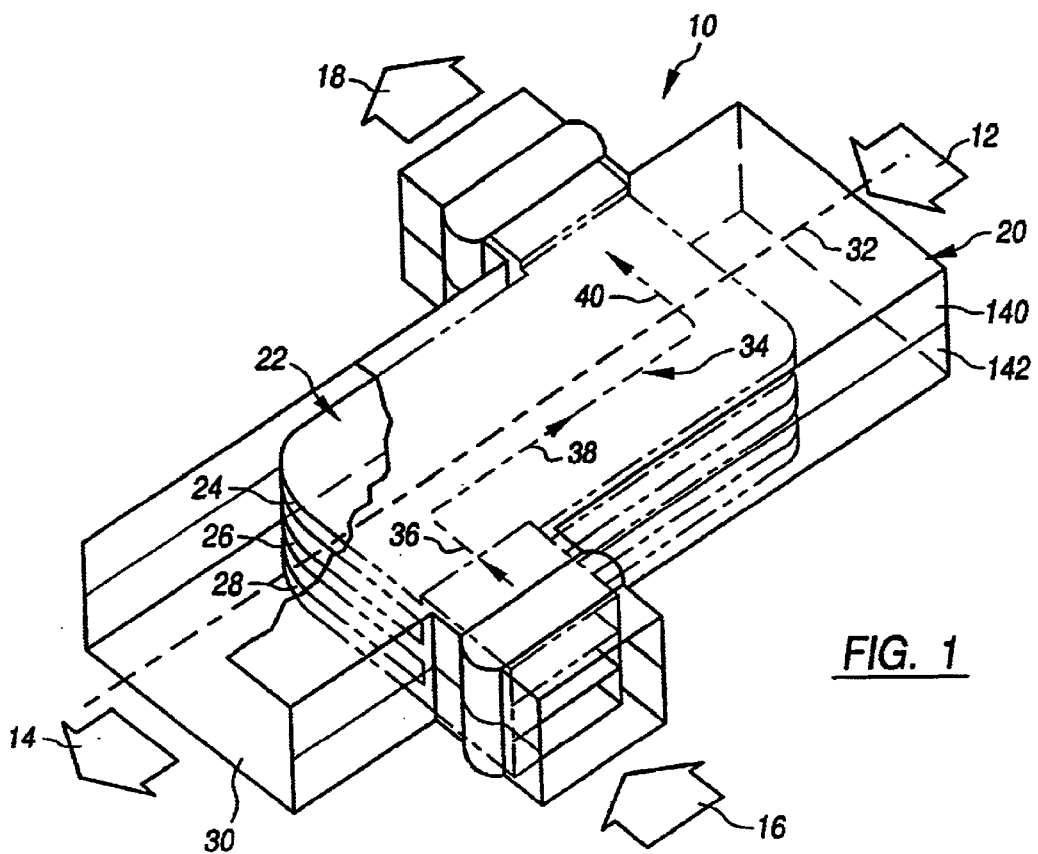
FIG. 1 is a diagrammatic isometric view, partially broken away, of a plastic heat exchanger.

While the present invention is open to various modifications and alternative constructions, the preferred embodiments shown in the drawings will be described herein in detail. It is understood, however, that there is no intention to limit the invention to the particular forms disclosed. On the contrary, the intention is to cover all modifications, equivalent structures and methods, and alternative constructions falling within the spirit and scope of the invention as expressed in the appended claims.

Referring now to FIG. 1, there is illustrated a heat exchanger 10 with counterflowing fluid paths, one path to be cooled and represented by an arrow 12 as the fluid enters the heat exchanger and another arrow 14 as the cooled fluid exits the heat exchanger, and a fluid path for a fluid doing the cooling represented by an arrow 16 for the cooling fluid entering the heat exchanger and an arrow 18 for the cooling fluid exiting the heat exchanger. For purposes of illustration, the heat exchanger includes an outer duct 20 which is generally tubular in shape and a stack 22 of inner ducts, such as the inner ducts 24, 26 and 28. The stacked inner ducts are disposed in an interior chamber 30 formed within the outer duct. As can be seen, the heat exchanger 10 is simply constructed and arranged although a commercial heat exchanger will have many more inner ducts as will be explained below.

As can also be appreciated, the heat exchanger 10 of the present invention is a counterflow heat exchanger even though the cooled fluid path 12, 14 and the cooling fluid path 16, 18 begin and end generally perpendicular to each other. The cooled fluid path 12, 14 establishes a first direction represented by a phantom line 32. The cooling fluid path 16, 18 is represented by a curved phantom line 34 which diagrammatically may be divided into an inlet portion 36, a middle portion 38 and an outlet portion 40. During the time that the cooling fluid path is in its middle portion, it is disposed substantially parallel to the first direction 32 but opposite to it. In this way a counterflow arrangement is created. As already mentioned, counterflow heat exchangers are more efficient when compared to cross flow heat exchangers, all other variables being equal.

Figure 2:
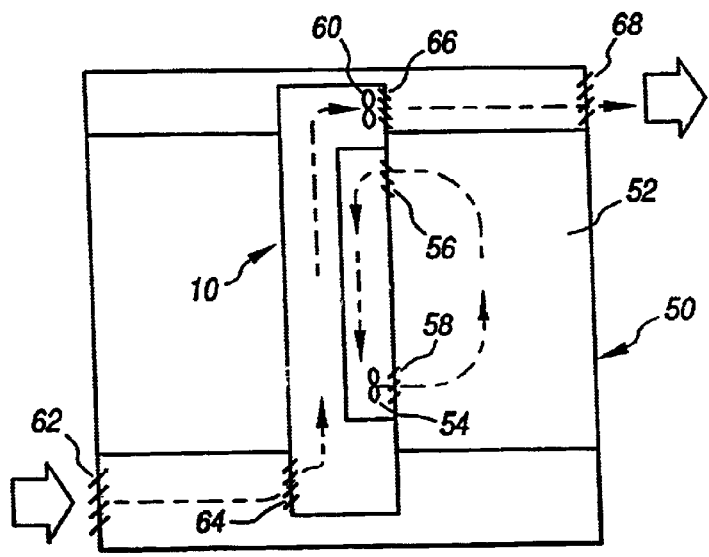
FIG. 2 is a diagrammatic elevation view of an electrical cabinet illustrating the basic concept of a heat exchanger in such an environment.

It is contemplated that the heat exchanger 10 may be used in an electrical enclosure or cabinet 50 as shown in diagrammatic form in FIG. 2 where the heat exchanger is placed in a sealed equipment chamber or compartment 52. A fan 54 draws air to be cooled from the compartment through an inlet vent 56, through the heat exchanger along a downward flow path and then back to the compartment through an outlet vent 58. Meanwhile, cooling air from outside the cabinet is drawn in by a fan 60 through a vent 62 in an outer wall of the cabinet, and through an inlet vent 64 of the heat exchanger. The air moves along an upwardly directed flow path through the heat exchanger in a parallel but opposite direction from the cooled air, and then through a heat exchanger outlet vent 66. Thereafter, the cooling air is exhausted through a vent 68 in another outer wall of the cabinet. It is noted, that the heat exchanged between the two air flows takes place without the cooling or cooled air ever mixing. Thus, the compartment 52 remains sealed even though its air is cooled.

The cooling and cooled fluid flows may move in an opposite direction from that shown if desired, and the cooling fluid may be represented by the arrows 12, 14 and the cooled fluid may be represented by the arrows 16, 18.

Figure 3:
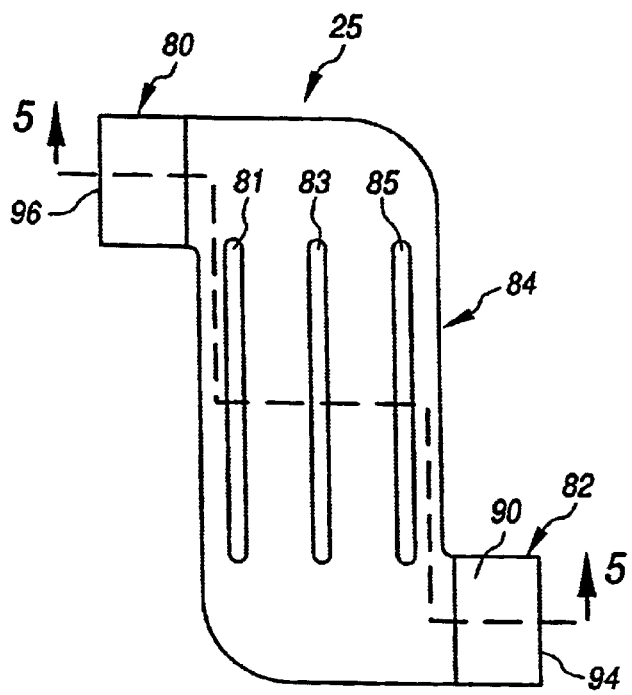
FIG. 3 is a front elevation view of an inner duct that may be used in the heat exchanger shown in FIG. 1.
Figure 4:
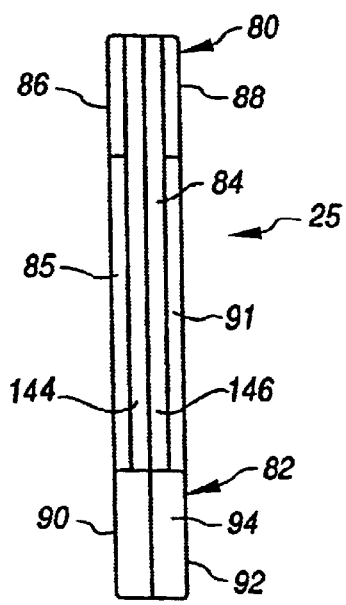
FIG. 4 is a side elevation view of the inner duct shown in FIG. 3.
Figure 5:
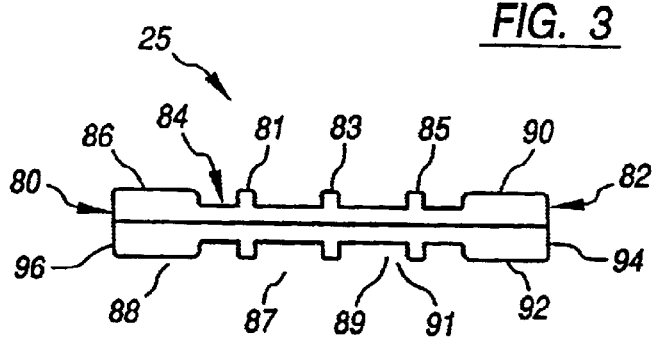
FIG. 5 is a sectional plan view of the inner duct shown in FIGS. 3 and 4 and taken along the line 5—5 of FIG. 3.
Figure 6:
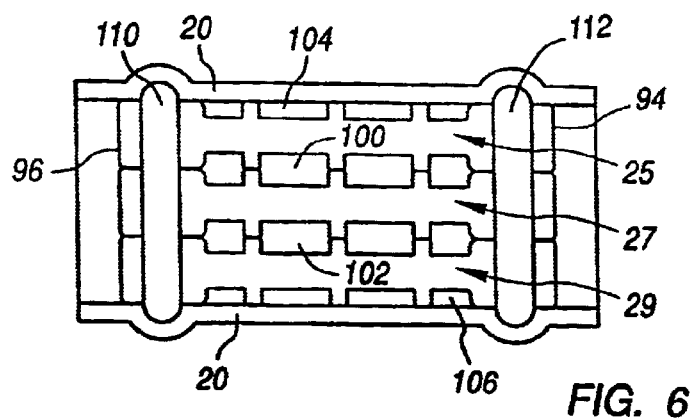
FIG. 6 is a plan view of a heat exchanger similar to that shown in FIG. 1.
Figure 7:
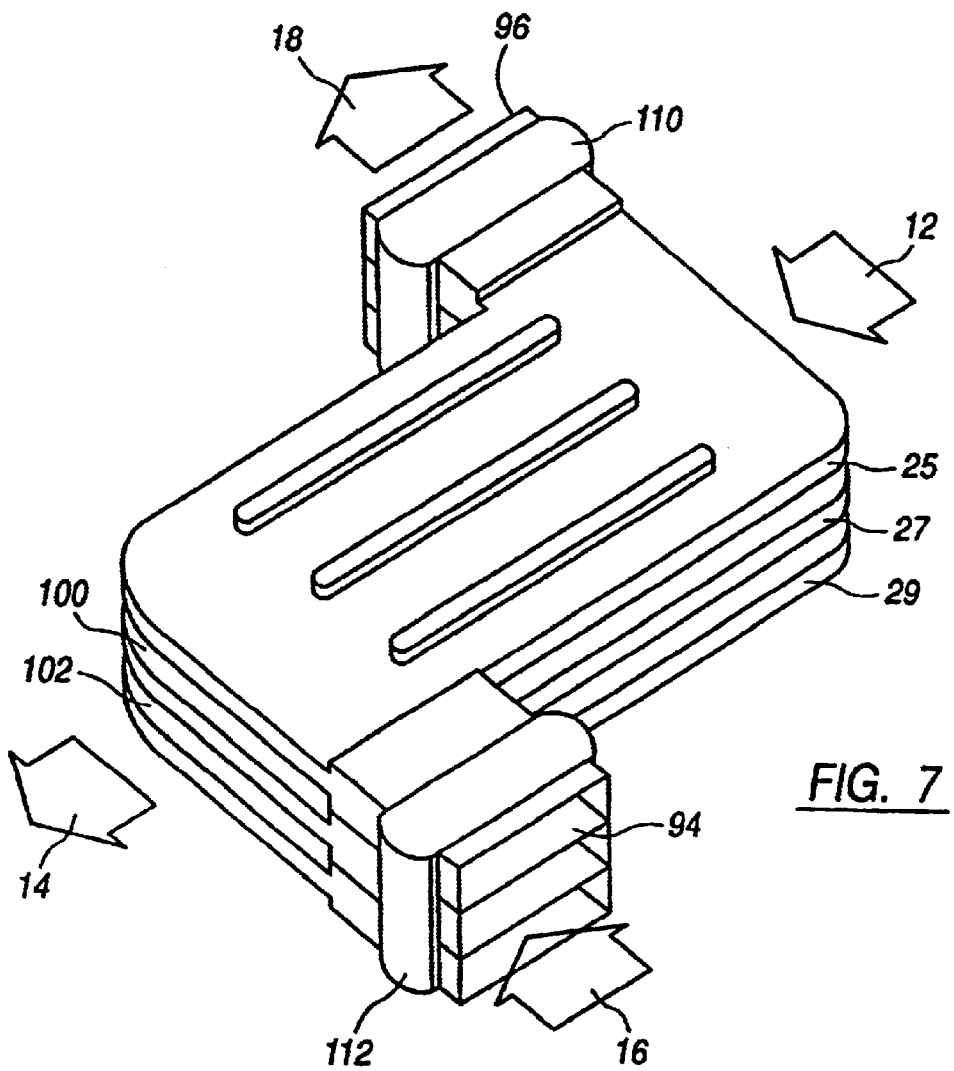
FIG. 7 is a diagrammatic isometric view of a stack of inner ducts.

Referring now to FIGS. 3, 4 and 5, another embodiment of an inner duct is shown in more detail. The duct 25 is a curved conduit forming a fluid passage with end portions 80, 82 and a middle portion 84. To help understand the relative dimensions of the duct, the vertical distance of the inner duct in FIG. 3 is defined as the length, the horizontal distance is defined as the width and the vertical distance in FIG. 5 is defined as the depth. It is quite apparent that the depth dimension of the end portions 80, 82 is about twice the depth dimension of most of the middle portion 84. Also, the upper and lower surfaces 86, 88, 90 and 92, FIG. 5, of the end portions are planar. This configuration allows the inner ducts to be stacked on the planar end portions as shown in FIGS. 6 and 7. When this is done, the end portions present a large area inlet 94 and a similar large area outlet 96 to the flow of fluid, such as the cooling air 16, 18.

The passage for fluid formed within the inner duct is initially generally horizontal through the inlet end portion 82 as shown in FIG. 3, then generally vertical through the middle portion 84 and then generally horizontal again through the outlet end portion 80. As can be readily appreciated, the inlet and outlet flow paths of the inner duct are generally perpendicular to the flow path through the middle portion of the duct. This feature allows the flow path through the middle portion 84 of the inner duct to be approximately parallel to the direction 32, FIG. 1, of the flow path through the outer duct. It is to be understood that the specific design of the inner and outer ducts may be varied from what is shown depending upon the availability of space or the specific geometry of the intended enclosure.

The inner duct 25 may also include projecting ribs 81, 83, 85 on one side of the middle portion 84 and another set of projecting ribs 87, 89, 91 on the opposite side of the middle portion. These ribs strengthen the walls of the inner duct, prevent flexing due to air pressure, may be used to optimize airflow (so as to eliminate dead spots) and provide additional surfaces to contact an adjacent inner duct when stacked as shown in FIG. 6. The ribs also increase the surface area between air flows which enhances heat transfer. It is to be noted that the inner ducts 24, 26, 28, FIG. 1, are a slightly different embodiment from inner duct 25 in that no projecting ribs are formed. Hence, it is understood that more or less ribs may be used, or none at all. Also, the shape of the ribs may be varied without departing from the present invention.

Referring now to FIGS. 6 and 7, three inner ducts 25, 27 and 29 are shown in a stacked disposition. When this is done, the larger end portions ensure that there is a space to each side of the middle portion such as the space 100 between the inner ducts 25 and 27 and the space 102 between the inner ducts 27 and 29. There are also top and bottom spaces 104, 106 between the inner duct 25 and the outer duct 20 and the inner duct 29 and the outer duct 20, respectively. These spaces form fluid passageways within the outer duct, where the passageways are coincident with the spaces 100, 102, 104 and 106. To ensure that there is no leakage of the cooled air flow passing through the outer duct and between the inner ducts, nor mixing of the cooled air and the cooling air, a first seal 110 is provided around the first end portions of the stacked inner ducts and a second seal 112 is provided around the second end portions of the stacked inner ducts. The fluid passages for the cooling air (or cooled air) may begin at the inlet end portions 94 of the stacked inner ducts, continue through the middle portions and exhaust through the stacked outlet end portions 96. The fluid passageways for the cooled air (or cooling air) are formed by the spaces between the middle portions of the inner ducts inboard of the two seals 110, 112. In practice there will be numerous inner ducts within a single outer duct and not just the three or four shown here for illustrative purposes. The large number of inner ducts results in a large number of fluid passageways. In turn, this increases the amount of inner duct surface area between the two fluids and enhances heat transfer between them.

Figure 8:
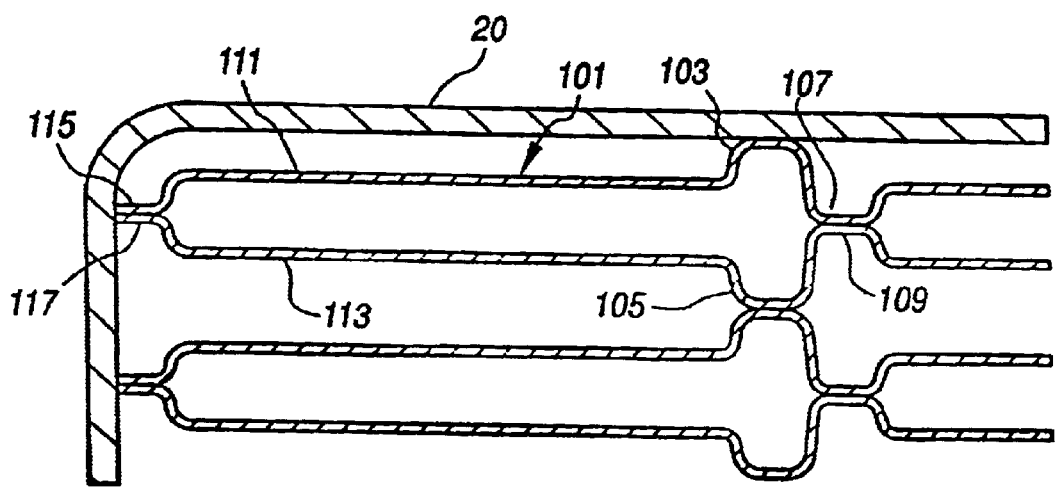
FIG. 8 is a partial diagrammatic section view of a modified heat exchanger.

Referring now to FIG. 8, yet another embodiment of the inner duct is shown. The inner duct 101 includes upper projecting rib 103 and lower projecting rib 105. Inboard of these projecting ribs are receding ribs, upper receding rib 107 and lower receding rib 109. The receding ribs may be used to strengthen the inner duct and to provide regions or webs for attachment, such as by welding. For example, an upper half 111 of the inner duct may be welded to a lower half 113 of the inner duct at the receding ribs 107,109. This may be done to enhance the welds made along upper peripheral lip 115 and lower peripheral lip 117 of the inner duct halves. Greater strength of the walls and of the welds may be required if the pressure of the flowing air is increased. Again, the inner ducts of FIG. 8 are stacked within the outer duct 20.

Figure 9:
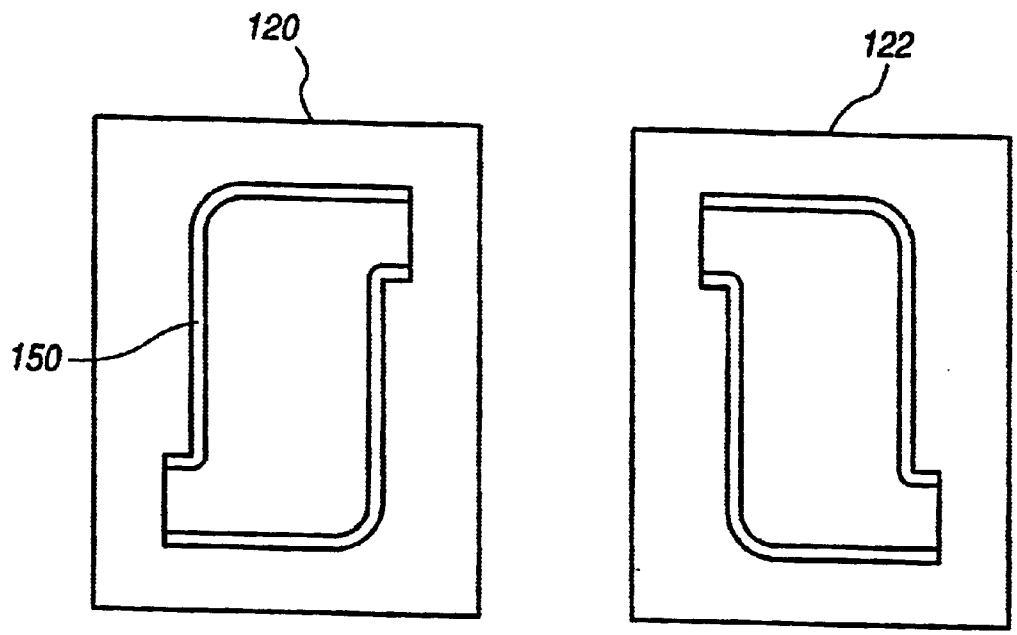
FIG. 9 is a front elevation view of mirror image molds for forming an inner duct.

The inner ducts may be inexpensively manufactured using a pair of mirror image molds 120, 122, FIG. 9, and a blow molding or thermoforming technique. These techniques are well known to those skilled in the art. In a like manner, the outer duct 20 may be made inexpensively using a pair of mirror image molds 130, 132, FIG. 10, and a blow molding or thermoforming technique. The inner and outer ducts may be split evenly so that the molds are identical except for orientation. Referring to FIG. 1, the two halves 140, 142 of the outer duct are clearly shown. The same is true of the two halves 144, 146 of the inner duct 25 as shown in FIG. 4.

Figure 10:
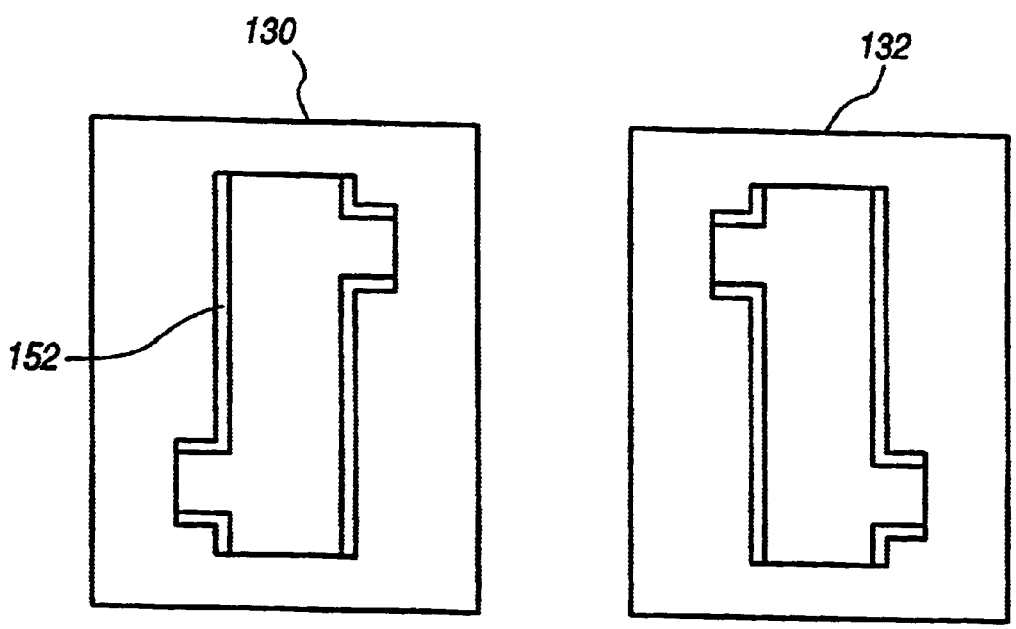
FIG. 10 is a front elevation view of mirror image molds for forming an outer duct.

Each of the duct halves may include a peripheral lip, such as the lip 150, FIG. 9 and the lip 152, FIG. 10. As mentioned, these are used to attach the duct halves together such as by ultrasonic welding or perhaps by an adhesive. These attachment techniques are also well known by those skilled in the art. Wall thicknesses for both the inner ducts and the outer duct are within the range of 0.010 to 0.020 inches and a thermoplastic plastic material, such as polycarbonate may be used for both ducts. Less expensive plastics may also be used but other characteristics of such plastics may not meet customer requirements for use in outdoor equipment cabinets. Under some circumstances, a heat conductive resin may be desirable, and it may be desirable to use an injection molding technique for forming the ducts.

The actual size of a heat exchanger for an equipment cabinet may fall within the approximate dimensions of thirty inches in length, eighteen inches in width and six inches in depth. Also a heat exchanger may include thirty to sixty inner ducts within one outer duct.

Figure 11:
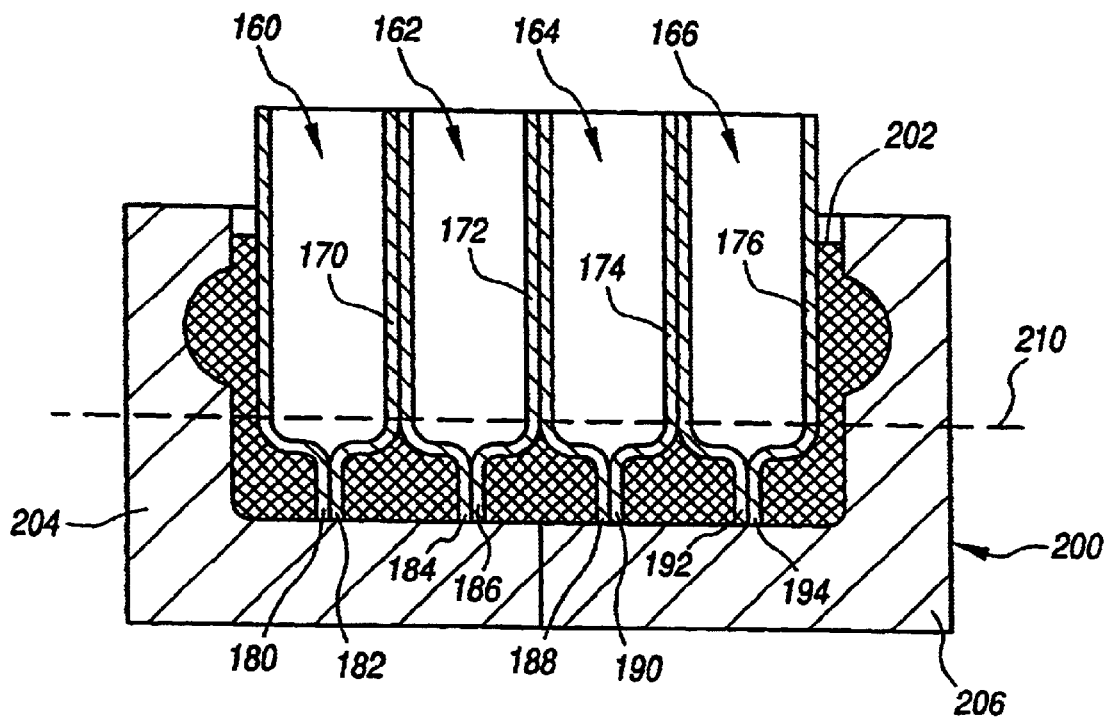
FIG. 11 is a diagrammatic plan view of a stack of inner ducts disposed in a mold.
Figure 12:
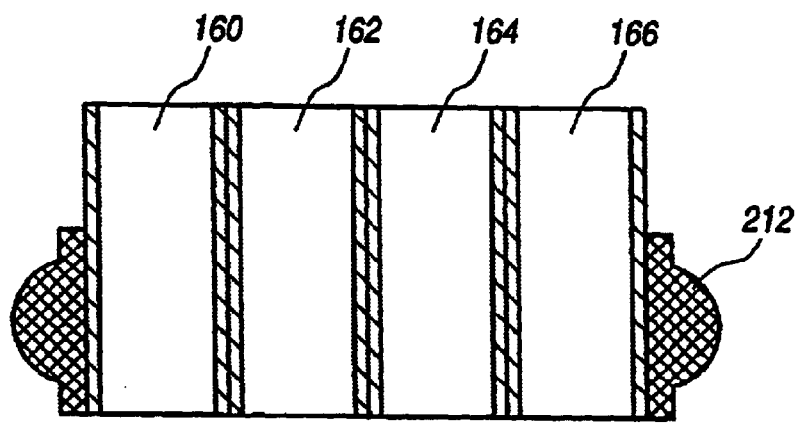
FIG. 12 is a diagrammatic plan view of the inner ducts of FIG. 11 after removal of the mold and after a cutting operation.
Figure 13:
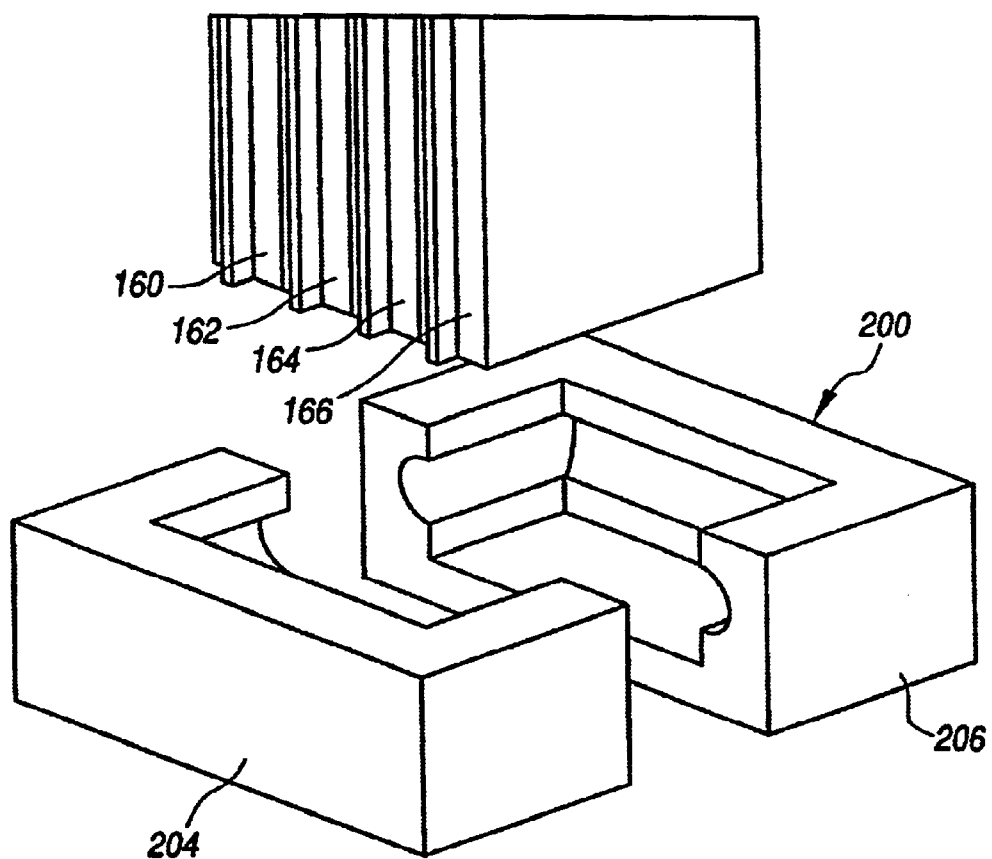
FIG. 13 is a diagrammatic isometric view showing the stack inner ducts being received by an open mold.

Referring now to FIGS. 11, 12, and 13, one process for forming the seals about the end portions of the inner ducts is illustrated. A stack of four inner ducts 160, 162, 164, 166 are placed adjoining one another. It is to be noted that the end portions 170, 172, 174, 176, respectively, of the four ducts are initially sealed. The end portions are formed with peripheral lips 180, 182, 184, 186, 188, 190, 192 and 194, respectively. After the molded halves of the inner ducts are sealed together, the first end portions are placed into a mold 200. Thereafter, a castable adhesive sealant 202 is placed into the mold such as by pouring. After the sealant hardens, the mold, which may be in two halves 204, 206, is removed. A "cut line" is established, such as represented in the FIG. 11 by the horizontal phantom line 210 and a part of the end portion is removed. By initially closing the end portions, a molding procedure may be used without causing any blockage of the ducts. The cut opens the end portions, and thereby the ducts, while maintaining the seal 212 as shown in FIG. 12. Molds and castable adhesive sealants are well known by those skilled in the art.

Figure 14:
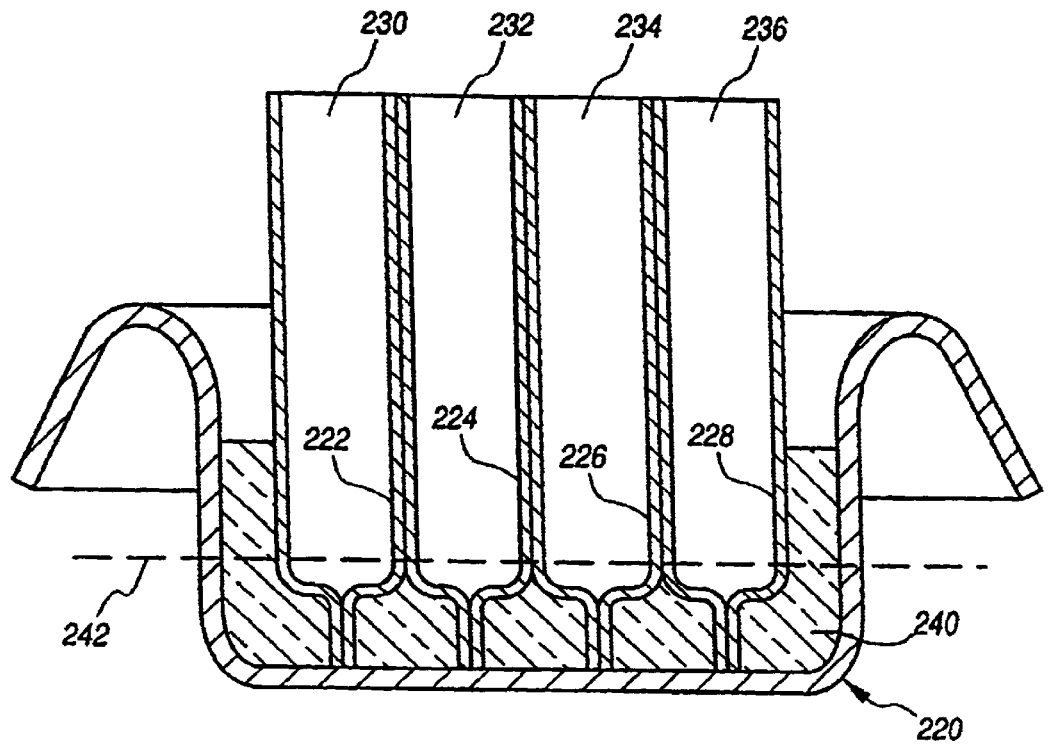
FIG. 14 is a diagrammatic plan view of a stack of inner ducts disposed in a seal cup.
Figure 15:
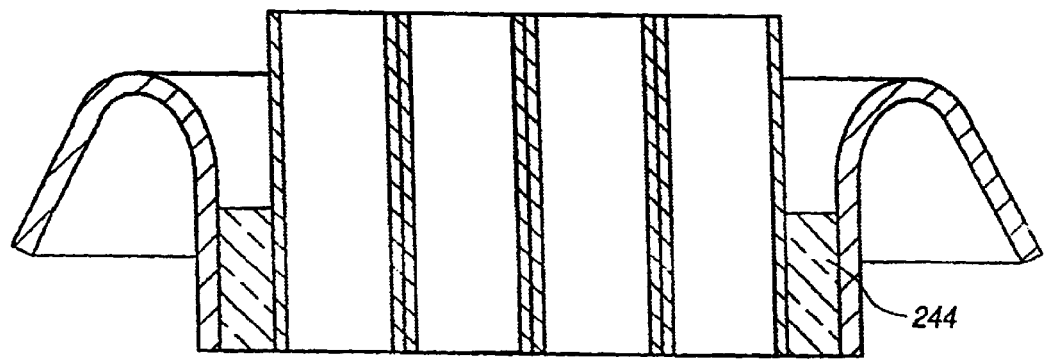
FIG. 15 is a diagrammatic plan view of the inner ducts after cutting of the seal cup and of a portion of the inner ducts.

A variation of the process is shown in FIGS. 14 and 15. Instead of a mold, a seal cup 220 is used to receive four end portions 222, 224, 226, 228 of four stacked inner ducts 230, 232, 234, 236, respectively. A castable adhesive sealant 240 is poured into the cup and then the sealant is allowed to cure. A cut line, represented by the phantom line 242, is established and a cut is made to open the ducts and form the geometry shown in FIG. 15. The remains of the seal cup are then removed and a seal 244 remains around the stacked inner duct end portions.

Figure 16:
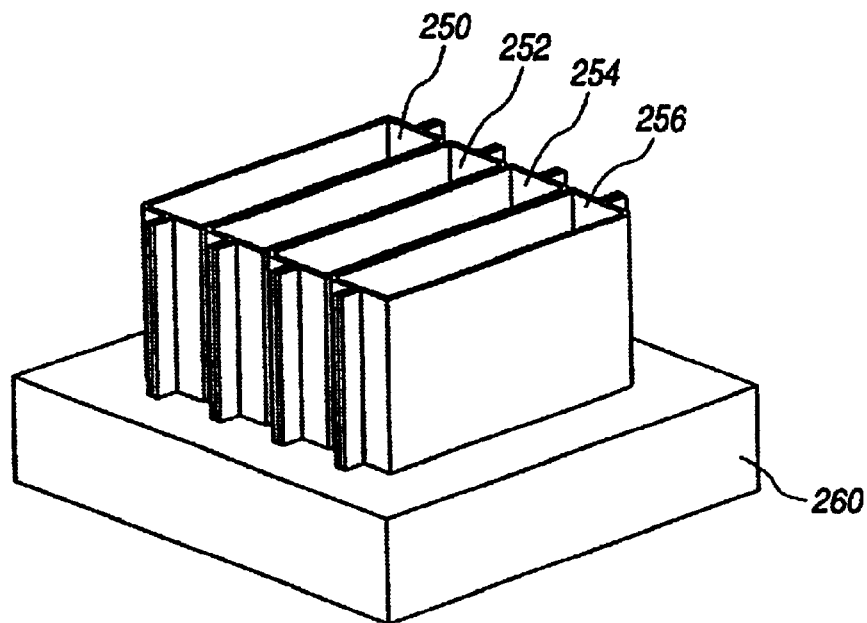
FIG. 16 is a diagrammatic isometric view of a stack of inner ducts having a seal press fitted to the stack.
Figure 17:
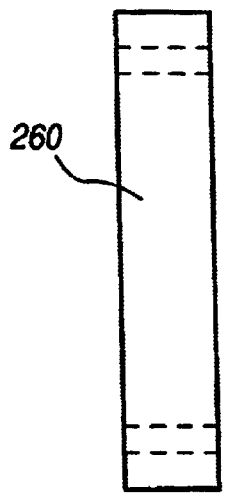
FIG. 17 is a front elevation view of the seal shown in FIG. 16.
Figure 18:
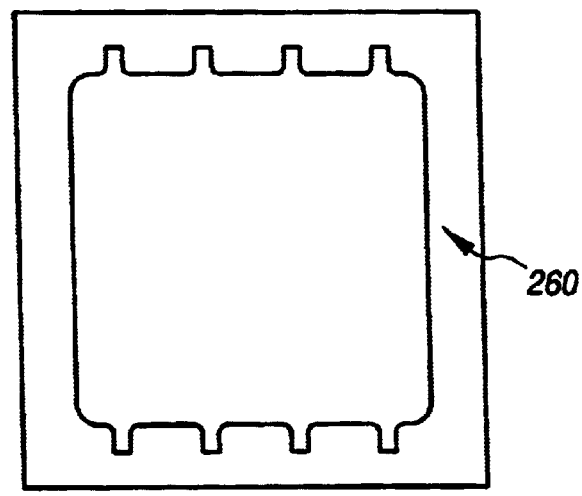
FIG. 18 is a side elevation view of the seal shown in FIGS. 16 and 17.

FIGS. 16, 17 and 18 illustrate yet another variation of forming a seal around the end portions of a stacked group of inner ducts. As shown in FIG. 16, four end portions 250, 252, 254, 256 of inner ducts are stacked, and a seal 260 is force fitted over and around the stacked inner ducts. In this situation, there may be no need to seal the ends of the inner ducts nor is there a need for a cutting step. The seal itself may be formed from an extrusion that has been cut to the desired thickness. Either variation, molding the seal or press fitting the seal is a relatively inexpensive procedure in which relatively inexpensive elements are employed.

Figure 19:
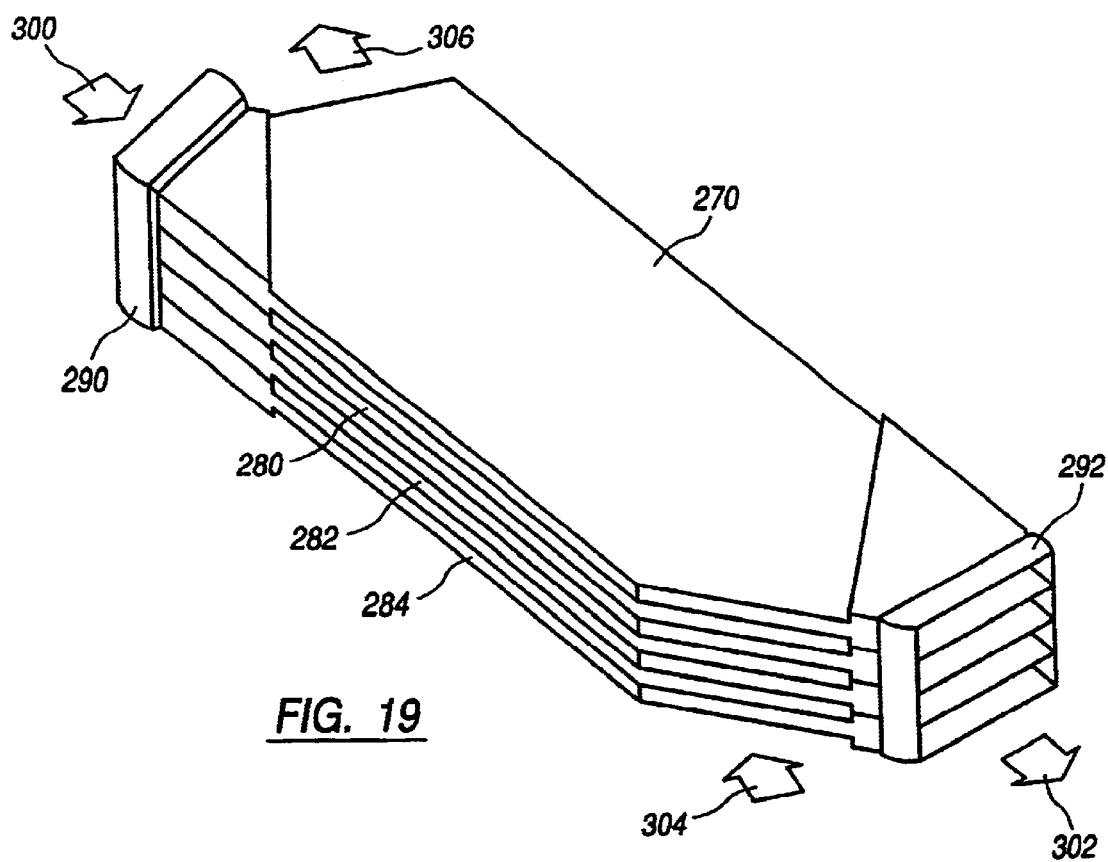
FIG. 19 is a diagrammatic isometric view of another variation of a stack of inner ducts.

Reference is now made to FIGS. 19–22. There is illustrated still another variation of an inner duct 270 having a middle portion 272 and two end portions, an inlet end portion 274 and an outlet end portion 276. As with the FIGS. 1 and 3 variations, the end portions have a greater depth than the middle portion to allow the inner ducts to be stacked one upon the other while providing a space between two adjacent inner ducts and between the end inner ducts and the outer duct. This is shown in FIG. 19, where four inner ducts 270, 280, 282, 284 are stacked and where the stack has surrounding seals 290, 292 about the end portions of the inner ducts. An outer duct (not shown) is formed about the stack to form a passageway for cooling fluid flow while the cooled fluid flow passes through the inner ducts. It is to be noted that the outer duct may be formed by portions of the cabinet or an enclosure if desired or if suggested by design constraints. Thus, inner walls of the enclosure may be used as the outer duct.

An important feature of the inner duct 270 is that the inlet end portion 274 and the outlet end portion 276 form with the middle portion 272 a relatively straight flow path or passage 277 shown in broken line. Also, the arrangement of the inner ducts, when stacked, continues to exhibit a relatively straight flow path or passageway 279 shown in broken line. It can be seen that the counterflows are roughly parallel along the entire heat exchanger. This is contrasted to the FIGS. 1 and 3 variations where the inlet and outlet flow paths are generally perpendicular to the flow paths around the middle portions.

To illustrate the flow paths of the FIGS. 19–22 variation, reference is made to FIG. 19 where the inlet cooled fluid path is represented by the arrow 300, the outlet cooled fluid path is represented by the arrow 302, the inlet cooling fluid path is represented by the arrow 304 and the outlet cooling fluid path is represented by the arrow 306. Once again, these paths may be reversed and the cooled fluid and cooling fluid flow paths exchanged.

The specification describes in detail several embodiments or variations of the present invention. Other modifications and variations will, under the doctrine of equivalents, come within the scope of the appended claims. For example, the halves of the ducts may be sealed without use of the lips. Or, the ducts may be molded as a single piece followed by a trimming step. Sizes and shapes may also vary. All of these are considered equivalent structures. Still other alternatives will also be equivalent as will many new technologies. There is no desire or intention here to limit in any way the application of the doctrine of equivalents.

What is claimed is:

1. A process for forming an inexpensive plastic counter-flow heat exchanger for telecommunication equipment cabinets comprising the steps of:

providing a first thermoform mold of geometry predetermined to be accommodated by an equipment cabinet;

molding in said first mold a plurality of ducts having a first structure, each duct of said first structured ducts having enlarged opposite end portions and a smaller cross sectional middle portion, said end portions of said first structured ducts having outer surfaces and closed ends and being offset from one another, each middle portion of said first structured ducts having outer surfaces, interior space for fluid flow and protrusions extending away from said outer surfaces;

forming a stack with opposite end portions from a plurality of said first structured ducts by abutting outer surfaces of end portions and protrusions of adjacent first structured ducts wherein fluid flow space is formed between outer surfaces of said middle portions of said abutting adjacent first structured ducts, said process not including bonding said abutting adjacent first structured ducts;

providing sealant molds for forming a seal around each of said opposite end portions of said stack of said plurality of abutting first structured ducts;

providing a castable sealant material;

placing one end portion of said stack of said plurality of abutting first structured ducts into one of said sealant molds;

placing some of said castable sealant material into said one of said sealant molds and around said closed ends of said one end portion of said stack of said plurality of abutting first structured ducts;

curing said sealant;

cutting away a portion of said one of said sealant molds, a portion of said sealant and said closed ends of said one end portion of said abutting first structured ducts to expose said interior spaces of said middle portions of said abutting first structured ducts;

placing the other end portion of said stack of said plurality of abutting first structured ducts into another one of said sealant molds;

placing some of said castable sealant material into said another one of said sealant molds and around said closed ends of said other end portion of said stack of said plurality of abutting first structured ducts;

curing said sealant;

cutting away a portion of said another one of said sealant molds, a portion of said sealant and said closed ends of said other end portion of said abutting first structured ducts to expose said interior spaces of said middle portions of said abutting first structured ducts;

providing a second thermoform mold of geometry predetermined to be accommodated by said equipment cabinet;

forming in said second thermoform mold a duct having a second structure; and enclosing with said second structured duct, said middle portions and the remaining sealant around said outer surfaces of said opposite end portions of said stack of said abutting first structured ducts wherein two different fluid flow paths are formed, a first path through the interior spaces of said middle portions of said abutting first structured ducts and a second path within said second structured duct and between outer surfaces of said middle portions of said abutting first structured ducts.

2. The processes claimed in claim 1 wherein:

forming said second structured duct includes the steps of providing a first duct mold part for forming a portion of said second structured duct and providing a second duct mold art for forming another portion of said second structured duct.

3. The process as claimed in claim 1 wherein:

said first mold includes two mold parts which are mirror images of one another.

4. The process as claimed in claim 1 wherein:

each of said first structured ducts includes a peripheral lip for closing said ends of said end portions.

5. The process as claimed in claim 1 wherein:

said seal mold is a seal cup.

* * * * *